(12) United States Patent
Gipson

(10) Patent No.: US 6,982,300 B2
(45) Date of Patent: *Jan. 3, 2006

(54) METHOD FOR PREPARING A PRESSURE SENSITIVE ADHESIVE FORMULATION INCLUDING AN ENHANCED POLYISOBUTYLENE MODIFIER

(75) Inventor: Betty L. Gipson, League City, TX (US)

(73) Assignee: Texas Petrochemicals LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/893,827

(22) Filed: Jul. 19, 2004

(65) Prior Publication Data

US 2004/0266936 A1    Dec. 30, 2004

Related U.S. Application Data

(62) Division of application No. 10/357,591, filed on Feb. 4, 2003, now Pat. No. 6,815,504.

(51) Int. Cl.
| | |
|---|---|
| *B65C 9/25* | (2006.01) |
| *C08F 8/00* | (2006.01) |
| *C08J 5/00* | (2006.01) |
| *C09J 101/00* | (2006.01) |
| *C09L 9/00* | (2006.01) |

(52) U.S. Cl. ...................... 525/191; 525/232; 156/324; 156/327

(58) Field of Classification Search ................. 525/191, 525/232; 156/327, 324

See application file for complete search history.

(56) References Cited

U.S. PATENT DOCUMENTS

| 6,407,170 B1 | 6/2002 | Johnson et al. |
| 6,683,138 B2 | 1/2004 | Baxter, Jr. et al. |
| 6,815,504 B2 * | 11/2004 | Gipson ...................... 525/191 |

FOREIGN PATENT DOCUMENTS

WO    WO 02/100153 A2    12/2002

* cited by examiner

*Primary Examiner*—Nathan M. Nutter
(74) *Attorney, Agent, or Firm*—James H. Marsh, Jr.; Stinson Morrison Hecker LLP

(57) ABSTRACT

A method for preparing an improved pressure sensitive adhesive includes incorporating into a base polymer, an PIB modifier that is made up of a homopolymer of isobutylene wherein a predominant portion of the double bonds are in either an alpha position or a beta position. The modifier may function as a plasticizer, a tackifier extender or a combination plasticizer and tackifier extender for the pressure sensitive adhesive.

35 Claims, No Drawings

METHOD FOR PREPARING A PRESSURE SENSITIVE ADHESIVE FORMULATION INCLUDING AN ENHANCED POLYISOBUTYLENE MODIFIER

CROSS REFERENCE TO RELATED APPLICATION

This application is a divisional of presently utility patent application Ser. No. 10/357,591 filed Feb. 4, 2003 now U.S. Pat. No. 6,815,504, from which priority benefits are claimed pursuant to 35 U.S.C. § 120. The entirety of the disclosure of said patent application Ser. No. 10/357,591 is hereby specifically incorporated herein by reference.

BACKGROUND OF THE INVENTION

1. Field of the Invention

The present invention relates to pressure sensitive adhesives (PSAs) and the like, and in particular to plasticizers and tackifier extenders for pressure sensitive adhesives. More particularly the invention relates to improved pressure sensitive adhesives that incorporate enhanced polyisobutylene (PIB) modifiers therein. The invention also relates to methods for improving the tack strenghth and shear holding strength of pressure sensitive adhesives by incorporating therein an enhanced PIB modifier.

2. The Prior Art Background

Pressure sensitive adhesives are well known products having many uses, including, for example, and without limitation, use as an adhesive layer for labels, packing tape, structural tape, medical tape and floor tiles. The adhesive properties of pressure sensitive adhesives and the length of time that the tackiness of such adhesives is retained may be improved and enhanced by the incorporation in the adhesives of modifiers such as plasticizers and tackifier extenders. Plasticizers and tackifier extenders are often incorporated into the adhesive by adding the same to the adhesive formulation during the production of the adhesive. Generally speaking, tackifier extenders are substances, which may be used in conjunction with conventional tackifying resins to achieve the same degree of tack at a lower concentration of the tackifying resin. Plasticizers are substances that improve the physical characteristics of an adhesive by making it softer and more ductile.

Conventional pressure sensitive adhesives typically include a base polymer composition which may be a single polymer or a mixture of polymers, one or more plasticizers, one or more tackifying resins, and perhaps other additives such as fillers, antioxidants and solvents. For example, a high molecular weight (i.e., 1,000,000 to 2,000,000 viscosity average molecular weight) polyisobutylene may also be used as a base polymer. Polyterpenes, which are usually solid, may be used as tackifying resins. Mineral oils may be used as plasticizers. Conventional polybutenes may be used as combination plasticizers and tackifier extenders. Additives may include fillers such as talc or calcium carbonate, antioxidants, and solvents.

As mentioned above, the performance of pressure sensitive adhesives may often be improved and enhanced by the incorporation therein of plasticizers and/or tackifier extenders. Conventional polybutene may often be used as both a plasticizer and a tackifier extender. Such polybutenes are simply added to the pressure sensitive adhesive (PSA) during formulation. The double bonds of these previously known conventional polybutene materials are mostly internal. That is to say, it is normal for at least about 90% of the double bonds to be at an internal position and for less than about 10% of the double bonds to be in a terminal (vinylidene) position. In addition, while the initial monomeric mixtures used to produce these conventional polybutenes may often be predominantly isobutylene, the same may also incorporates substantial quantities of monomers other than isobutylene. Thus, the conventional polybutenes that have been used as tackifiers in the past may generally be referred to as copolymers or terpolymers. For example, such conventional polybutenes often and commonly incorporate approximately 10% or so by weight of 1-butene and/or 2-butene, with only about 90% of the monomeric units in the polymer being isobutylene units.

The incorporation of conventional polybutenes into the pressure sensitive adhesive is accomplished simply by introducing the polybutene into a vessel along with all of the other components of the pressure sensitive adhesive formulation and heating and blending the mixture.

SUMMARY OF THE INVENTION

In accordance with one aspect of the concepts and principles of the present invention a new and highly useful pressure sensitive adhesive which comprises a base polymer and a modifier. The modifier may desirably be provided in the form of an enhanced PIB polymer product comprising a homopolymer of isobutylene wherein a predominant portion of the double bonds are in an alpha or beta position. The modifier may function as a plasticizer, a tackifier extender, or both. In further accordance with the preferred aspects of the invention, the enhanced PIB polymer product may desirably have a polydispersity no greater than about 2.2 and a number average molecular weight ($M_N$) that is within the range of from about 900 to about 3000.

Preferably, in further accordance with the concepts and principles of the invention, at least about 95%, preferably at least about 96%, desirably at least about 97%, even more desirably at least about 98%, and ideally at least about 99% of the monomeric units incorporated in the PIB modifier molecules are isobutylene moieties. Even more desirably, no more than about 1% of the monomeric units incorporated in the PIB modifier molecules are something other than isobutylene moieties.

In still further accord with the concepts and principles of the invention, at least about 40%, preferably at least about 50%, even more preferably at least about 60%, desirably at least about 70%, more desirably at least about 80%, even more desirably at least about 90%, and ideally more than 90% of the double bonds of the enhanced PIB polymeric modifier of the invention may be in the alpha position. In a most preferred form of the invention, no more than about 1% of the double bonds of the PIB polymer product are in a position other than alpha or beta.

Desirably, after removal of any solvent used in the formulation of the improved pressure sensitive adhesives of the invention, the same may include from at least about 10 to about 60% or more by weight of the enhanced PIB plasticizer and tackifier extender.

The invention also provides a method for improving characteristics such as the tack strength and shear strength properties of a pressure sensitive adhesive that comprises including an enhanced PIB plasticizer and tackifier extender in the pressure sensitive adhesive formulation.

DETAILED DESCRIPTION OF THE PREFERRED EMBODIMENTS

In accordance with the concepts and principles of the present invention, and as set forth above, it has been discovered that many properties, including tack strength, shear strength, and viscoelasticity of a pressure sensitive adhesive, can be improved, by incorporation therein, as a modifier, an enhanced PIB polymer product having a higher vinylidene (terminal double bond) content than conventional polybutenes and which is comprised essentially of a homopolymer of isobutylene wherein no more than about 5% of the monomeric units of the homopolymer comprise something other than isobutylene monomers. Enhanced PIB materials suitable for use in connection with the present invention are described in several patents and patent applications which are owned by the owner of the present application.

U.S. Pat. No. 6,562,913 issued May 13, 2003 and entitled Process for Producing High Vinylidene Polyisobutylene (the "'913 patent") describes a process for the production, inter alia, of enhanced polyisobutylene (PIB) products. Some grades of enhanced PIB are referred to as high vinylidene PIB (HV-PIB) which also may sometimes be referred to as highly reactive PIB (HR-PIB). The terms HV-PIB and HR-PIB are essentially synonymous. The enhanced PIB may also sometimes be characterized by the term isobutylene homopolymer.

U.S. Pat. No. 6,525,149 issued Feb. 25, 2003 and entitled Process for Preparing Polyolefin Products (the "'149 patent") describes the use of the process of the '913 patent for the production of polyolefins generally, including certain enhanced PIB polymer compositions. Patent application Ser. No. 10/102,279 filed Mar. 19, 2002 and entitled Mid-Range Vinylidene Content Polyisobutylene Polymer Product and Process for Producing the same (the "'279 application') describes certain mid-range vinylidene containing enhanced PIB polymer compositions. The entireties of the disclosures of the '913 and '149 patents and the '279 application are hereby incorporated into and made a part of the present disclosure by this specific reference thereto.

The number average molecular weight ($M_N$) of the enhanced PIB polymer compositions to be used as pressure sensitive adhesive modifiers in accordance with the concepts and principles of the invention may desirably range from about 900 to about 3000. The alpha position double bond (vinylidene) content of the enhanced PIB products may desirably range from less than about 50% to more than about 90%, with the remainder of the double bonds ideally being in the beta position. Preferably, the polydispersity of the enhanced PIB product of the invention may range from about 1.2 to about 2.2, depending upon the molecular weight of the polyisobutylene. Desirably, the amount of isobutylene monomeric units incorporated in the enhanced PIB product to be used as a pressure sensitive adhesive modifier should be at least about 95% and ideally may be about 99% or higher of the total monomeric moieties of the enhanced PIB product.

In accordance with the invention, the enhanced PIB to be used as a modifier to provide the improved pressure sensitive adhesive of the invention may desirably and preferably be produced using the procedures described in the '913 and '149 patents and the '279 application. Thus, a major and extremely important feature of the invention is simply that the enhanced PIB to be used as a pressure sensitive adhesive modifier to provide the improved properties, including improved tack and/or shear strength, should desirably have a greater concentration of vinylidene double bonds, have a lower polydispersity, and have a higher percentage of isobutylene monomeric units than does conventional polybutene. Furthermore, the improved pressure sensitive adhesive product of the invention may desirably include from at least about 10 to about 60% or more by weight, after evaporation of any solvent used during formulation, of the enhanced PIB modifier.

COMPARATIVE EXAMPLE

To establish the effectiveness of the enhanced PIB modifiers of the invention, a pressure sensitive adhesive was prepared using an Exxon Chemical high molecular weight polyisobutylene elastomer (Vistanex MM L-120) as a base polymer, a Hercules polyterpene tackifier (Piccolyte S-115), toluene as a solvent, and an enhanced PIB modifier. A BP Amoco conventional polybutene (H-300) was used as a modifier in a comparative sample employed to compare the properties of a pressure sensitive adhesive formulated in accordance with the concepts and principles of the invention with the properties of a prior art pressure sensitive adhesive.

In accordance with the invention, an enhanced PIB modifier was produced employing the loop reactor described in the '913 patent identified above. The catalyst composition consisted of a premixed $BF_3$/methanol complex wherein the ratio of $BF_3$ to methanol was about 1:1. The reaction mixture was maintained at a temperature of from about 50 to about 60° F., and the residence time was controlled at about 120 seconds. The resultant enhanced PIB product (TPC 1160) had a number average molecular weight ($M_N$) of approximately 1600, an average alpha position double bond (vinylidene) content of about 60% and an average beta position double bond content of about 40%. That is to say, essentially all of the PIB molecules of the TPC 1160 product contained either alpha position double bonds or beta position double bonds and essentially none contained the isomeric tetra substituted double bonds. In addition, at least about 99% of the monomeric units of the enhanced TPC 1160 product were isobutylene moieties, and the polydispersity of the enhanced TPC 1160 product was about 1.4. The TPC 1160 PIB material is approximately half as viscous as conventional polybutenes such as BP Amoco H-300. This results in easier handling during the formulation of pressure sensitive adhesives.

Exxon Vistanex MM L-120 is a commercially available tough, rubber solid polyisobutylene polymer having the following properties:

| | |
|---|---|
| Specific gravity | 0.92 |
| Color | white to pale yellow |
| Ash, wt % | 0.3 max |
| Volatiles, wt % | 0.3 max |
| Stabilizer, wt % | 0.10% |
| Staudinger Viscosity Molecular Weight | 99,000–117,000 |
| Flory Viscosity Average Molecular Weight | 1,450,000–1,870,000 |
| Intrinsic Viscosity (dl/g) | 3.16–3.72 |

Piccolyte S-115 is a commercially available pale, inert, low molecular weight, thermoplastic hydrocarbon resin that is produced from monomeric beta-terpene. It has the following typical properties:

| | |
|---|---|
| Softening point, R&B, ° C. | 115 |
| Color, Gardner | 2 |
| Bromine number | 30 |
| Density at 25° C., kg/l | 0.99 |
| Ash, % | 0.1 |
| Flashpoint, COC, ° C. | 234 |
| Melt viscosity, ° C., | |
| 1 poise | 220 |
| 10 poises | 175 |
| 100 poises | 150 |

The TPC 1160 modifier product described above was incorporated into a pressure sensitive adhesive using standard pressure sensitive adhesive production methodology. The TPC 1160 PIB modifier concentration in the finished pressure sensitive adhesive, after evaporation of the solvent, was approximately 30.6%. The formulation before removal of the toluene solvent was as follows:

| | |
|---|---|
| Vistanex MM L120 | 100 parts by weight |
| Piccolyte S-115 | 70 parts by weight |
| TPC 1160 | 75 parts by weight |
| Toluene | 980 parts by weight |

For comparative purposes, a similar pressure sensitive adhesive was produced using essentially the same methodology except that in this case a commercially available conventional polybutene (BP Amoco H-300) was used as the modifier instead of the TPC 1160. BP Amoco H-300 is a conventional polybutene with low vinylidene content (typically <10%). The $M_N$ of the BP Amoco H-300 was about 1600 and its polydispersity was in the range of 1.8 to 2.0.

Tack strengths of the two pressure sensitive adhesives were measured in accordance with ASTM D2979 probe tack test. The resulting tack strength data as shown in Table 1 illustrates the fact that the tack strength of the TPC 1160 modified pressure sensitive adhesive formulation is 2 to 3 times higher than the tack strength of the conventional polybutene formulation.

TABLE 1

| Tack strength (N * μm) | | |
|---|---|---|
| Rate of Displacement (μm/sec) | TPC 1160 PSA Formulation | H-300 PSA Formulation |
| 1.0 | 45 | 16 |
| 5.0 | 47 | 23 |
| 10 | 65 | 31 |

Shear strengths were measure in accordance with ASTM D3654. The resulting shear strength data as depicted in Table 2 shows that the shear strength of the PIB 1160 modified pressure sensitive adhesive formulation is about 10% better than the tack strength of the conventional polybutene modified formulation.

TABLE 2

| Shear Strength Time to Failure (hrs) at 18° C. | |
|---|---|
| TPC 1160 modified PSA | 15.4 |
| H-300 modified PSA | 13.8 |

The linear viscoelastic region of the TPC 1160 modified pressure sensitive adhesive formulation as depicted in Table 3 is four times that of the conventional polybutene modified formulation.

TABLE 3

| Rheological Test Results Linear Viscoelastic Range (N * μm) | |
|---|---|
| TPC 1160 modified PSA | 0–2000 |
| H-300 modified PSA | 0–500 |

Summarizing the foregoing, when pressure sensitive adhesives are improved in accordance with the concepts and principles of the invention by incorporating therein the enhanced PIB product modifier of the invention, the improved pressure sensitive adhesives have improved end-use application due to the fact that the enhanced PIB modifier product:

(1) provides higher tack and shear strength due at least in part to the high purity and consistency of the enhanced PIB;

(2) provides improved handling because it has a lower viscosity at ambient conditions than conventional polybutenes;

(3) provides improved plasticizing ability over conventional polybutenes; and (4) provides improved viscoelasticity when compared with conventional polybutenes.

In the preferred embodiments of the invention described above, an enhanced PIB modifier was used to improve the properties of a base polymer/tackifier system comprising a high molecular weight polyisobutylene elastomeric base polymer and a polyterpene resin tackifier. However, the invention is not limited to this specific base polymer/tackifier pressure sensitive adhesive system. That is to say, the enhanced PIB modifier product of the invention is suitable for incorporation in and providing improved properties to a number of pressure sensitive adhesive systems, wherein the base polymer comprises, for example, a styrene butadiene rubber, a natural rubber, a polyacrylate, an ethylene/butylene/isoprene block copolymer, or an ethylene vinyl acetate copolymer, and the tackifying resin comprises, for example, a rosin, a terpene resin, or a pinene. Specifically, but without limitation, the enhanced PIB modifier product of the invention may be used to improve the properties of systems comprising, for example, (1) a natural rubber base polymer and a resin emulsion tackifier (Hevereaz C-200; Heavetex Corp.); (2) a styrene butadiene rubber base polymer and a low molecular weight flowable butyl rubber tackifier derived from virgin butyl rubber (Kalene 800, 800V70, 1300 or 1300V70; Elementis Specialty Performance Polymers); (3) a styrene/isoprene/styrene block copolymer base polymer and a $C_5$ hydrocarbon resin tackifier (Wingtack 86 or 95; Goodyear); (4) a styrene butadiene rubber base polymer and a terpene phenolic resin tackifier (Nirez 300, 2019, 7042, V-2040, V-2040HM or V-2150; Arizona Chemical Co.); and (5) a natural rubber base polymer and a terpene phenolic resin tackifier (Nirez 300, 2019, 7042, V-2040, V-2040HM or V-2150). Specifically, the enhanced PIB modifier product of the invention may be used as a tackifier extender and/or as a plasticizer in each of the base polymer/tackifier systems identified above, as well as in each and every base polymer/tackifier system where conventional polybutenes have been used previously as a tackifier extender, as a plasticizer, as both a tackifier extender and a plasticizer or simply as a modifier for any other purpose.

I claim:

1. A method for preparing a pressure sensitive adhesive having improved properties comprising providing a pressure sensitive adhesive base structure and including in said base structure a PIB modifier, said PIB modifier comprising a homopolymer of isobutylene wherein a predominant portion of the double bonds are in either an alpha position or a beta position.

2. A method as set forth in claim 1, wherein said PIB modifier has a polydispersity no greater than about 2.2.

3. A method as set forth in claim 1, wherein said PIB modifier has a $M_N$ no greater than about 3000.

4. A method as set forth in claim 3, wherein said PIB modifier has a $M_N$ which is at least about 900.

5. A method as set forth in claim 1, wherein at least about 92% of the monomeric units incorporated in the PIB modifier molecules are isobutylene moieties.

6. A method as set forth in claim 1, wherein at least about 95% of the monomeric units incorporated in the PIB modifier molecules are isobutylene moieties.

7. A method as set forth in claim 1, wherein at least about 99% of the monomeric units incorporated in the PIB modifier molecules are isobutylene moieties.

8. A method as set forth in claim 1, wherein no more than about 1% of the monomeric units incorporated in the PIB modifier molecules are something other than isobutylene moieties.

9. A method as set forth in claim 1, wherein at least about 40% of the double bonds of the PIB modifier molecules are in the alpha position.

10. A method as set forth in claim 1, wherein at least about 50% of the double bonds of the PIB modifier molecules are in the alpha position.

11. A method as set forth in claim 1, wherein at least about 60% of the double bonds of the PIB modifier molecules are in the alpha position.

12. A method as set forth in claim 1, wherein at least about 70% of the double bonds of the PIB modifier molecules are in the alpha position.

13. A method as set forth in claim 1, wherein at least about 80% of the double bonds of the PIB modifier molecules are in the alpha position.

14. A method as set forth in claim 1, wherein at least about 90% of the double bonds of the PIB modifier molecules are in the alpha position.

15. A method as set forth in claim 1, wherein more than 90% of the double bonds of the PIB modifier molecules are in the alpha position.

16. A method as set forth in claim 1 wherein no more than about 1% of the double bonds of the PIB modifier molecules are in a position other than the alpha or beta.

17. A method as set forth in claim 9 wherein no more than about 1% of the double bonds of the PIB modifier molecules are in a position other than the alpha or beta.

18. A method as set forth in claim 10, wherein no more than about 1% of the double bonds of the PIB modifier molecules are in a position other than the alpha or beta.

19. A method as set forth in claim 11, wherein no more than about 1% of the double bonds of the PIB modifier molecules are in a position other than the alpha or beta.

20. A method as set forth in claim 12, wherein no more than about 1% of the double bonds of the PIB modifier molecules are in a position other than the alpha or beta.

21. A method as set forth in claim 13, wherein no more than about 1% of the double bonds of the PIB modifier molecules are in a position other than the alpha or beta.

22. A method as set forth in claim 14, wherein no more than about 1% of the double bonds of the PIB modifier molecules are in a position other than the alpha or beta.

23. A method as set forth in claim 15, wherein no more than about 1% of the double bonds of the PIB modifier molecules are in a position other than the alpha or beta.

24. A method as set forth in claim 1, wherein from about 10 to about 60% by weight of said PIB modifier is included in said pressure sensitive adhesive.

25. A method as set forth in claim 2 wherein from about 10 to about 60% by weight of said PIB modifier is included in said pressure sensitive adhesive.

26. A method as set forth in claim 3 wherein from about 10 to about 60% by weight of said PIB modifier is included in said pressure sensitive adhesive.

27. A method as set forth in claim 6 wherein from about 10 to about 60% by weight of said PIB modifier is included in said pressure sensitive adhesive.

28. A method as set forth in claim 7 wherein from about 10 to about 60% by weight of said PIB modifier is included in said pressure sensitive adhesive.

29. A method as set forth in claim 10, wherein from about 10 to about 60% by weight of said PIB modifier is included in said pressure sensitive adhesive.

30. A method as set forth in claim 11, wherein from about 10 to about 60% by weight of said PIB modifier is included in said pressure sensitive adhesive.

31. A method as set forth in claim 12, wherein from about 10 to about 60% by weight of said PIB modifier is included in said pressure sensitive adhesive.

32. A method as set forth in claim 13, wherein from about 10 to about 60% by weight of said PIB modifier is included in said pressure sensitive adhesive.

33. A method as set forth in claim 14, wherein from about 10 to about 60% by weight of said PIB modifier is included in said pressure sensitive adhesive.

34. A method as set forth in claim 15, wherein from about 10 to about 60% by weight of said PIB modifier is included in said pressure sensitive adhesive.

35. A method as set forth in claim 16, wherein from about 10 to about 60% by weight of said PIB modifier is included in said pressure sensitive adhesive.

* * * * *